US012767234B2

(12) United States Patent
Yu et al.

(10) Patent No.: US 12,767,234 B2
(45) Date of Patent: Oct. 20, 2026

(54) STEEL TUBE AS REINFORCEMENT FOR VEHICLE STRUCTURE

(71) Applicant: Cleveland-Cliffs Steel Properties Inc., Cleveland, OH (US)

(72) Inventors: Miao Yu, Northville, MI (US); Sobhan T. Nazari, Novi, MI (US); Jimmy J. Zhang, Troy, MI (US); Panagiotis Makrygiannis, Windsor (CA); Feng Zhu, LaSalle (CA); Sajan G. Elengikal, Novi, MI (US); Jun Hu, Liberty Township, OH (US); Erik Russel Anderson, Maumee, OH (US); Scott Stevens, Macomb, MI (US); Yu-Wei Wang, Farmington Hills, MI (US)

(73) Assignee: Cleveland-Cliffs Steel Properties Inc., Cleveland, OH (US)

(*) Notice: Subject to any disclaimer, the term of this patent is extended or adjusted under 35 U.S.C. 154(b) by 266 days.

(21) Appl. No.: 18/660,349

(22) Filed: May 10, 2024

(65) Prior Publication Data

US 2024/0383534 A1 Nov. 21, 2024

Related U.S. Application Data

(60) Provisional application No. 63/466,477, filed on May 15, 2023.

(51) Int. Cl.
*B62D 25/02* (2006.01)
*B62D 29/00* (2006.01)

(52) U.S. Cl.
CPC ......... *B62D 25/025* (2013.01); *B62D 29/007* (2013.01)

(58) Field of Classification Search
CPC ...... B62D 25/025; B62D 25/02; B62D 25/20; B62D 21/15; B62D 21/157; B62D 29/007
USPC .......... 296/209
See application file for complete search history.

(56) References Cited

U.S. PATENT DOCUMENTS

| | | | | |
|---|---|---|---|---|
| 8,960,781 | B2 * | 2/2015 | Rawlinson | B62D 25/02 180/68.5 |
| 10,483,510 | B2 | 11/2019 | Stephens et al. | |
| 11,524,645 | B2 | 12/2022 | Pendergrass | |
| 11,572,103 | B2 * | 2/2023 | Limousin | B62D 25/02 |
| 2018/0334192 | A1 * | 11/2018 | Terada | B62D 25/025 |

(Continued)

FOREIGN PATENT DOCUMENTS

| | | | | |
|---|---|---|---|---|
| CN | 117940588 A | | 4/2024 | |
| EP | 2976250 B1 | * | 4/2018 | B62D 25/025 |

(Continued)

OTHER PUBLICATIONS

International Search Report and Written Opinion for PCT/US2024/028714, mailed Aug. 26, 2024.

(Continued)

*Primary Examiner* — Carly W. Lynch
(74) *Attorney, Agent, or Firm* — FBT Gibbons LLP

(57) ABSTRACT

A rocker panel for use in a vehicle, the rocker panel includes an outboard plate, an inboard plate, and a reinforcement structure. The reinforcement structure is disposed between the inboard plate and the outboard plate. The reinforcement structure includes one or more discrete steel tubes extending longitudinally between the outboard plate and the inboard plate.

12 Claims, 13 Drawing Sheets

(56) References Cited

U.S. PATENT DOCUMENTS

| | | | | |
|---|---|---|---|---|
| 2022/0063728 | A1 | 3/2022 | Kuipers et al. | |
| 2022/0289298 | A1 | 9/2022 | Kuipers | |
| 2023/0008826 | A1 | 1/2023 | Schoeffter et al. | |
| 2023/0016200 | A1* | 1/2023 | Matsui | B62D 29/007 |
| 2023/0147528 | A1* | 5/2023 | Qin | B62D 21/157 296/209 |

FOREIGN PATENT DOCUMENTS

| | | | | |
|---|---|---|---|---|
| JP | 2003137129 | A * | 5/2003 | B60R 21/02 |
| KR | 102468042 | B1 * | 11/2022 | B62D 21/157 |

OTHER PUBLICATIONS

Office Action with Search Report for Taiwan Patent Application No. 113127671 mailed on Sep. 15, 2025.

* cited by examiner

FORCE DISPLACEMENT

Force-Effective Energy Absorption vs. Displacement

STEEL TUBE AS REINFORCEMENT FOR VEHICLE STRUCTURE

PRIORITY

This application claims priority to U.S. Provisional Application Ser. No. 63/466,477, entitled "Steel Tube as Reinforcement for Vehicle Structure," filed on May 15, 2023, the disclosure of which is incorporated by reference herein.

BACKGROUND

The present invention pertains to structural reinforcement of one or more components used in vehicles. Vehicles use a variety of structural components to protect both passengers and internal mechanical and electrical systems. In the event of a collision, such structural components may be configured to absorb energy and/or deform in a more controlled and predictable way. Reinforcement structures used in combination with such structural components may contribute to the ability of such structural components to absorb energy and/or deform in a more controlled and predictable way.

One such structural component may be a rocker panel, for example. In a vehicle, one or more rocker panels may extend near the bottom of the vehicle below the passenger doors between the front and rear wheels. In some rocker panels, it may be desirable to include structural reinforcement. For instance, in electric or internal combustion electric hybrid vehicles, a battery or array of batteries may be included. Such batteries may be positioned near the rocker panels, extending along the bottom of the vehicle. Such reinforcement may be desirable in this circumstance to protect such batteries from side-impact collisions.

Examples of various reinforcement structures are disclosed in US Pub. No. 2023/0016200, entitled "Rocker Component with Tapered Shape," published on Jan. 19, 2023; US Pub. No. 2022/0289298, entitled "Multi-Beam Side Frame Assembly," published on Sep. 15, 2022; U.S. Pat. No. 11,524,645, entitled "Beam Assembly with Multi-Hollow Formation," issued on Dec. 13, 2022; US Pub. No. 2022/0063728, entitled "Rocker Assembly Insert with Opposed Crush Channels," published on Mar. 3, 2022; U.S. Pat. No. 8,960,781, entitled "Single Piece Vehicle Rocker Panel," issued on Feb. 24, 2015; US Pub. No. 2023/0008826, entitled "Reinforcement for a Side-Impact," published on Jan. 12, 2023; and U.S. Pat. No. 10,483,510, entitled "Polarized Battery Tray for a Vehicle," issued on Nov. 19, 2019. The disclosure of each of the above-cited US patents and publications is incorporated by reference herein.

DETAILED DESCRIPTION

A variety of vehicle structures may be suitable for one or more reinforcement configurations. Although examples are described herein in the context of reinforcement of a rocker panel, it should be understood that the reinforcement configurations described herein may be readily used as or in combination with a variety of alternative load bearing vehicle structures. Suitable alternative structures may include, for example, posts such as A-posts, B-posts, C-posts, D-posts, bumpers, roof bow, roof rails, dash panels, cross members, window rails, etc. Additionally, although examples are described herein in the context of side-impact mitigation to protect components such as batteries, it should be understood that the reinforcement configurations described herein may be readily used to protect other vehicle components or regions. For instance, reinforcement configurations described herein may be used to protect motors, engines, electrical components, passenger compartments, storage compartments, and/or etc.

Figure 1:
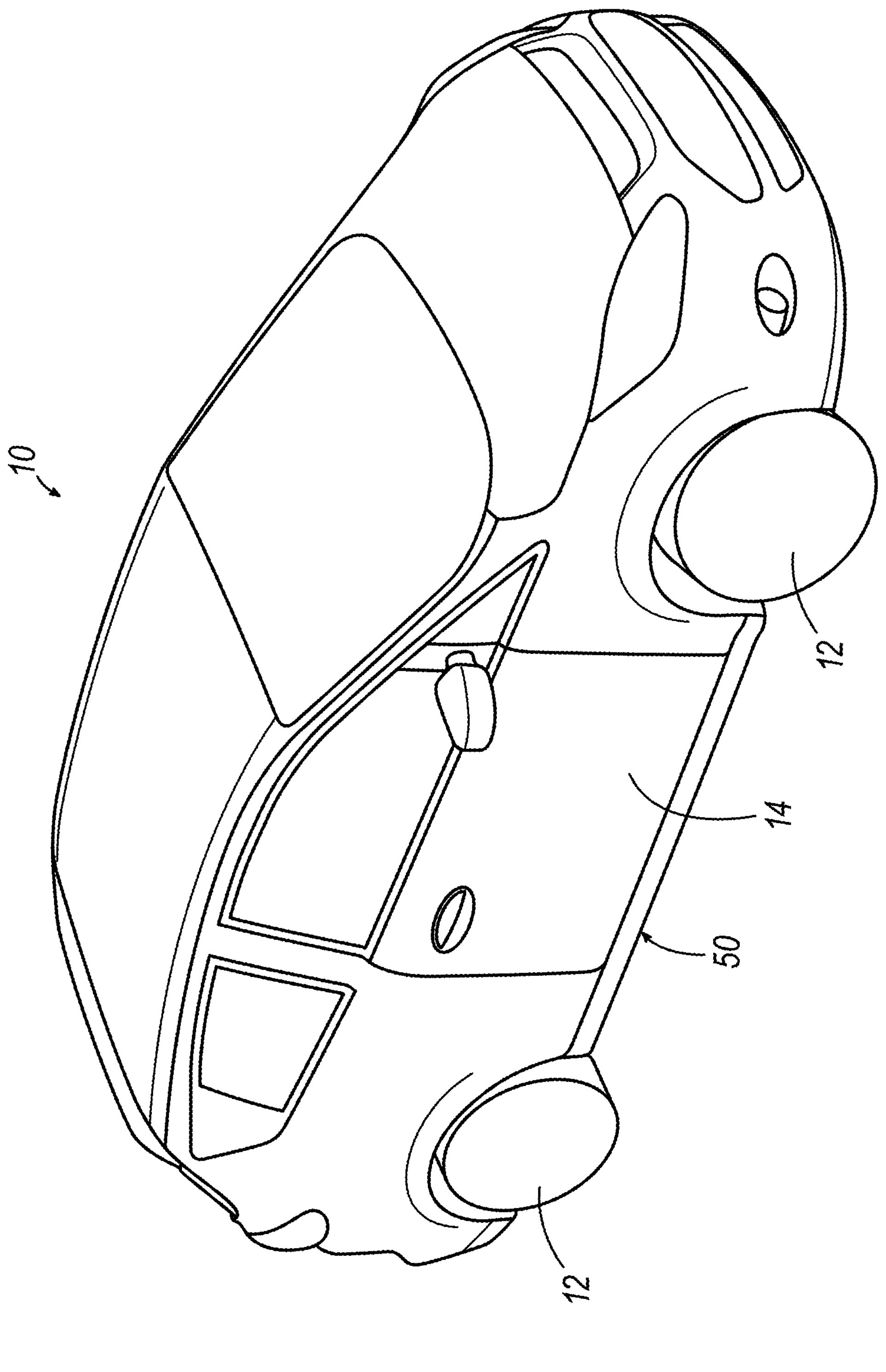
FIG. 1 depicts a perspective view of an example of a vehicle.

FIG. 1 shows an example of a vehicle (10) including wheels (12), and a plurality of doors (14). Although vehicle (10) of the present example is shown as being of a particular configuration (e.g., 4-door compact passenger vehicle), it should be understood that a variety of alternative configurations for vehicle (10) may be used in other examples. Generally, passengers may enter and exit vehicle (10) through one or more of doors (14), while wheels (12) may be used to propel vehicle (10). Although not shown, it should be understood that vehicle (10) may include a powertrain configured to drive wheels (12). Suitable powertrains may include electric motors, internal combustion engines, or combinations thereof. As will be described in greater detail below, one or more batteries may be enclosed within vehicle (10) to communicate power to or from motors, engines, and/or various accessory components.

Vehicle (10) further includes a rocker panel (50) extending between wheels (12) and below one or more doors (14). Rocker panel (50) of the present example is shown as a single panel extending from one wheel (12) to another. In other examples, rocker panel (50) may be formed of an assembly of a plurality of interconnected rocker panels (50). Although not shown, it should be understood that vehicle (10) includes a rocker panel (50) on opposing sides of vehicle (10) (e.g., right and left sides). Additionally, while rocker panel (50) of the present example is positioned generally below one or more doors (14), it should be understood that in some examples, at least a portion of rocker panel (50) may extend upwardly relative to one or more doors (14) beneath at least a portion of one or more doors (14). In other words, rocker panel (50) and one or more doors (14) may overlap by at least some amount in some examples.

Rocker panel (50) is generally configured to provide structural rigidity to vehicle (10) by extending from the front of vehicle (10) to the rear of vehicle (10). The structural rigidity provided by rocker panel (50) may be through a variety of dimensions. For instance, rigidity may come in the form of resisting various tensile loads originating from components of vehicle (10), movement of vehicle (10), or collisions to vehicle (10). Similarly, rigidity may come in the form of resisting various compressive loads also originating from components of vehicle (10), movement of vehicle (10), or collisions to vehicle (10). Rocker panel (50) is also generally configured to provide structural unity to vehicle (10) by connecting the front of vehicle (10) to the rear of vehicle (10).

Figure 2:
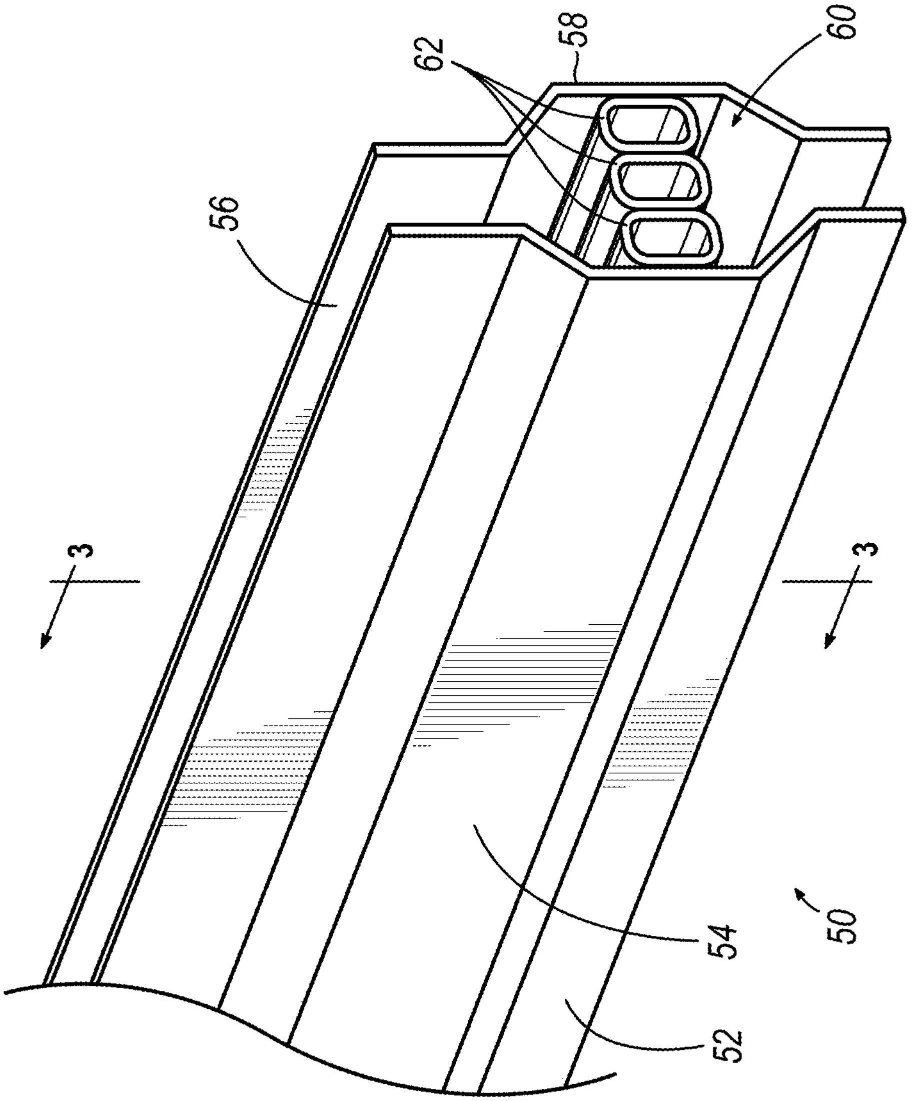
FIG. 2 depicts a partial perspective view of an example of a reinforced rocker panel that may be incorporated into the vehicle of FIG. 1.

Rocker panel (50) of the present example additionally includes certain reinforcement structures configured to respond to side-impact collisions. As best seen in FIG. 2, rocker panel (50) of the present example includes a reinforcement structure (60) positioned between an outboard plate (52) and an inboard plate (56). Both outboard plate (52) and inboard plate (56) include a respective tapered portion (54, 58). Each tapered portion (54, 58) extends outwardly from a portion of outboard plate (52) and inboard plate (56), respectively. This outward taper is generally configured to accommodate the structure of reinforcement structure (60) between outboard plate (52) and inboard plate (56). Although tapered portions (54, 58) in the present example are of a generally angular structure, it should be understood that in other examples, tapered portions (54, 58) may be curved or bulbous.

Figure 3:
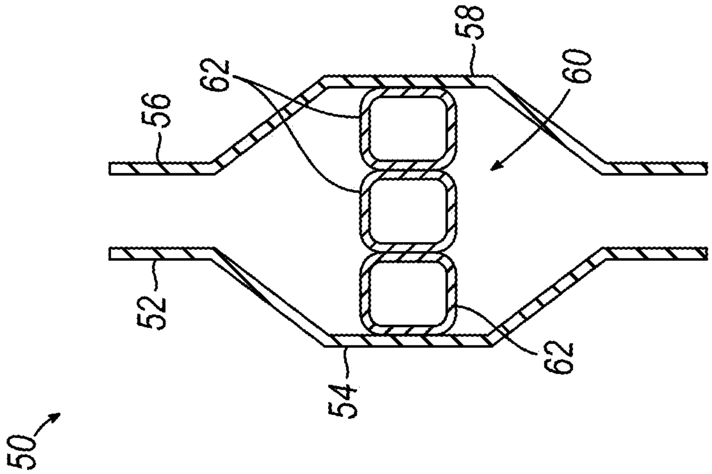
FIG. 3 depicts a front cross-sectional view of the reinforced rocker panel of FIG. 2, the cross-section taken along line 3-3 of FIG. 2.

As best seen in FIGS. 2 and 3, reinforcement structure (60) includes a plurality of tubes (62) positioned to together extend from outboard plate (52) to inboard plate (56). Tubes (62) are generally configured to provide structural reinforcement for rocker panel (50). Specifically, tubes (62) are configured to provide both energy absorption and intrusion protection. In other words, tubes (62) may be configured to deform in a predetermined way to thereby absorb energy from a collision and avoid intrusion of any portion of rocker panel (50) into a predetermined envelope.

Although tubes (62) of the present example are shown in a particular configuration, it should be understood that tubes (62) may be in a variety of alternative configurations. Such alternative configurations may be desirable to provide scalability to meet target performance and flexibility to fit target product design requirements. For instance, scalability may be provided by the use of different material grades, gauges, and joining schemes for tubes (62). Similarly, flexibility may be provided by the use of different orientations or layouts for tubes (62). Some suitable alternative configurations for tubes (62) will be described in greater detail below, while other alternative configurations for tubes (62) will be apparent to those of ordinary skill in the art in view of the teachings herein.

In the present example, tubes (62) are oriented between outboard plate (52) and inboard plate (56) within the space defined by tapered portions (54, 58). Tubes (62) additionally extend longitudinally between outboard plate (52) and inboard plate (56) for the length of rocker panel (50), although in other examples, tubes (62) may be alternatively isolated to one or more sections of rocker panel (50). The present example includes three tubes (62) aligned along a single axis spanning transversely from outboard plate (52) to inboard plate (56). In other words, tubes (62) for a single row from one side of rocker panel (50) to another.

Although tubes (62) of the present example are of a particular configuration or orientation relative to each other, it should be understood that the orientation of tubes (62) may be varied in other examples. Such variation in the orientation of tubes (62) may be desirable to promote flexibility to adapt performance of reinforcement structure (60) to suite targeted performance criteria. As will be described in greater detail below, suitable alternative orientations and configurations may include, for example rows of additional tubes (62) or rows of less tubes (62). In addition or in the alternative, in some examples tubes (62) may be arranged in a grid or array with multiple rows of tubes (62). Still in other examples, some tubes (62) may be arranged in a grid or array, while other tubes (62) may be arranged in a row (62). Other suitable configurations or orientations of tubes (62) will be apparent to those of ordinary skill in the art in view of the teachings herein.

Each tube (62) in the present example defines a square or box-shaped cross-section. Such a square or box-shaped configuration may be desirable for ease of manufacturability or material availability. In other examples, tubes (62) may define a variety of alternative shapes. For instance, in some examples, each tube (62) may be cylindrical, rectangular, triangular, D-shaped, or etc. In yet other examples, non-tubular structures may be used such as I-shaped structures. In still other examples, one or more tubes (62) may be shaped differently than other tubes (62) to provide various combinations of the shapes described above.

Each tube (62) in the present example also defines a particular gauge or wall thickness. In the present example, wall thickness is about 1.2 mm. In other examples, various alternative gauges or wall thicknesses may be used. For instance, in some examples, the wall thickness of each tube (62) is between 1.2 mm and 1.8 mm. In yet other examples, the wall thickness of each tube (62) is between 1.0 and 2.0 mm. In still other examples, the wall thickness of each tube is between 1.0 and 3.6 mm. In still other examples, various alternative gauges or wall thickness may be used as will be apparent to those of ordinary skill in the art in view of the teachings herein. In such examples, suitable wall thicknesses may have a relationship with the material used for each tube (62) to achieve certain performance criteria such as energy absorption strength, and/or toughness. Thus, tubes (62) of higher-grade materials may result in a lower grade or wall thickness due to the higher strength or toughness of the higher grade material, and vice versa.

Each tube (62) generally comprises a steel material. The particular grade used for the steel material may correspond to desired performance criteria such as energy absorption and/or intrusion protection. In the present example, the steel material is a dual phase 780 grade (DP780). In other examples, various alternative grades may be used. For instance, in other examples, the steel material may be a 1500 grade (e.g., ULTRALUME® 1500 manufactured by Cleveland-Cliffs, Inc.). In yet other examples, the steel material may include mild-steel grades, high-strength steel grades, advanced high-strength steel grades, and/or ultra-high strength steel grades of 1650 MPa and up to 2000 MPa. In addition, or in the alternative, each tube (62) may be of a tailor-welded configuration in some examples with one or more combinations of different steel grades and thicknesses in a single tube (62). Such differing thicknesses and grades may be applied to different configurations of the wall of tube (62) such as front, back, and sides. As described above, in some examples, the particular grade of steel material used may have a predetermined relationship with the gauge or wall thickness of each tube (62). Thus, in examples where the grade or wall thickness of each tube (62) is restricted, a corresponding restriction may exist with respect to the wall thickness or grade of each tube (62).

Each tube (62) is generally secured or fastened to each adjacent tube (62). In the present example, each tube (62) is joined to each adjacent tube (62) by laser welding. In other examples, various alternative joining methods may be used. For instance, in some examples, tubes (62) may be joined by other welding processes such as arc welding, resistance welding, or solid-state welding processes. In yet other examples, tubes (62) may be joined by mechanical fastening systems using various fasteners or combinations thereof such as bolts, fasteners, collars, clamps, and/or etc. In still other examples, tubes (62) may be joined by chemical fastening methods such as adhesives. Of course, any such joining methods described herein may be combined with other such joining methods to join tubes (62) using a combination of joining methods. It should be understood that similar joining methods may be used to join tubes (62) to outboard plate (52) and/or inboard plate (56).

As described above, tubes (62) may be arranged in a variety of orientations or configurations relative to each other. FIGS. 4-12 show alternative reinforcement structures (70, 80, 90, 210, 220, 230, 240, 250, 260) that may be readily incorporated into rocker panel (50) in addition to, or in-lieu of, reinforcement structure (60) described above. As with reinforcement structure (60) described above, each alternative reinforcement structure (70, 80, 90, 210, 220, 230, 240, 250, 260) includes one or more tubes (72, 82, 92, 212, 214, 222, 224, 232, 242, 244, 252, 254, 256, 262, 266) that may add structural reinforcement to rocker panel (50).

Although tubes (72, 82, 92, 212, 214, 222, 224, 232, 242, 244, 252, 254, 256, 262, 266) are shown as being similar to tubes (62) described above, it should be understood each tube (72, 82, 92, 212, 214, 222, 224, 232, 242, 244, 252, 254, 256, 262, 266) may similarly be configured with a variety of shapes, gauges or wall thicknesses, and/or materials. For instance, like with tubes (62) described above, each alternative tube (72, 82, 92, 212, 214, 222, 224, 232, 242, 244, 252, 254, 256, 262, 266) may have a variety of alternative shapes or combinations of shapes such as cylindrical, rectangular, triangular, D-shaped, or etc. Similarly, the gauge or wall thickness of each tube (72, 82, 92, 212, 214, 222, 224, 232, 242, 244, 252, 254, 256, 262, 266) may vary between about 1 mm to about 2 mm. The material of each tube (72, 82, 92, 212, 214, 222, 224, 232, 242, 244, 252, 254, 256, 262, 266) may likewise be generally steel with the steel material being a variety of grades or combination of grades. Tubes (72, 82, 92, 212, 214, 222, 224, 232, 242, 244, 252, 254, 256, 262, 266) may also be joined to adjacent structures by a variety of joining techniques such as welding, brazing, mechanical fastening, and/or chemical fastening.

Figure 4:
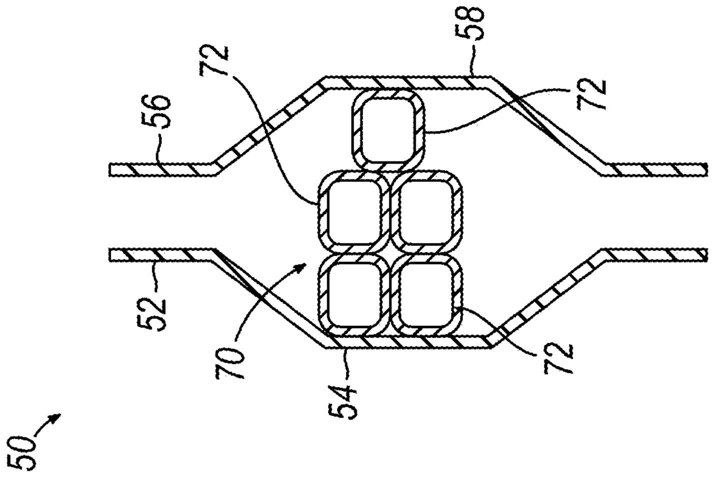
FIG. 4 depicts a front cross-sectional view of another example of a reinforced rocker panel that may be readily incorporated into the vehicle of FIG. 1.

FIG. 4 shows an alternative reinforcement structure (70) including tubes (72) in a grid-like or matrix-like configuration. As can be seen, five tubes (72) are included and arranged in a contiguous formation extending between outboard plate (52) and inboard plate (56). Specifically, in the present example, the formation of tubes (72) includes four tubes (72) in a 4×4 grid and a single tube (72) adjacent to the 4×4 grid of tubes (72). All tubes (72) are generally aligned symmetrically along a common transverse axis extending perpendicularly relative to outboard plate (52) and inboard plate (56).

Additionally, due to the combination of the 4×4 grid of tubes (72) and the single tube (72), the overall configuration of tubes (72) is asymmetrical with more tubes being positioned on one side of rocker panel (50) (e.g., outboard plate (52) side) versus the other side of rocker panel (50). This asymmetrical configuration may be desirable to control the energy absorption or distortion characteristics of reinforcement structure (70). For instance, tubes (72) configured as a 4×4 grid may be configured to absorb more energy relative to a single tube (72). Thus, the 4×4 grid of tubes (72) may be positioned near an area of expected impact (e.g., outboard plate (52)).

Figure 5:
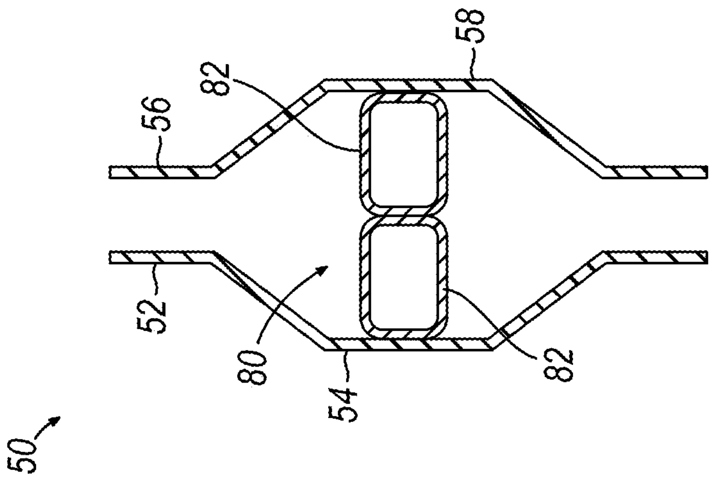
FIG. 5 depicts a front cross-sectional view of yet another example of a reinforced rocker panel that may be readily incorporated into the vehicle of FIG. 1.

FIG. 5 shows another alternative reinforcement structure (80) including tubes (82) in an alternative row configuration similar to the configuration described above with respect to tubes (62). In the present example, reinforcement structure (80) includes two tubes (82) aligned contiguously along a common transverse axis extending perpendicularly relative to outboard plate (52) and inboard plate (56).

Because tubes (82) may span the same distance as tubes (62) described above with only two tubes (82), the cross-sectional shape of each tube (82) may be modified accordingly. For instance, each tube (82) of the present example is generally of a rectangular configuration with the elongate portion of the rectangular shape parallel to the common transverse axis extending perpendicularly relative to outboard plate (52) and inboard plate (56). Of course, in other examples, tubes (82) may also be of a square-shaped configuration, but with lager dimensions to accommodate the increased span.

Figure 6:
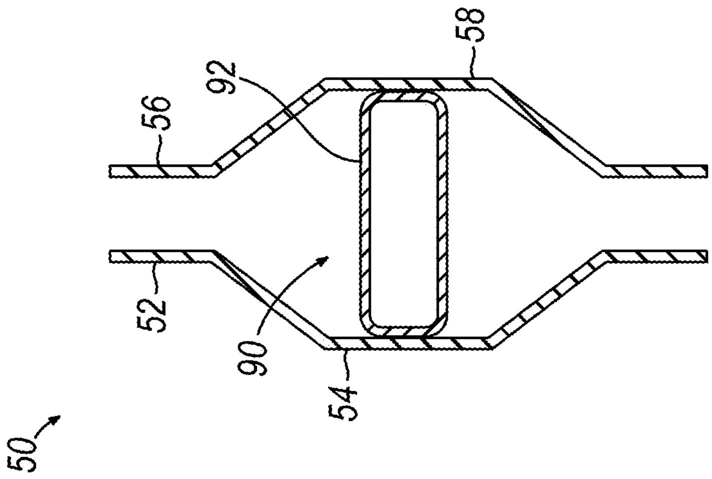
FIG. 6 depicts a front cross-sectional view of still another example of a reinforced rocker panel that may be readily incorporated into the vehicle of FIG. 1.

FIG. 6 shows yet another alternative reinforcement structure (90) including a single tube (92). Tube (92) of the present example defines a generally rectangular cross-sectional shape. Because tube (92) may span the same distance as tubes (62) described above with only a single tube (92), the cross-sectional shape of tube (92) is elongated to span the same distance. Thus, tube (92) defines a rectangular shape with the elongate portion of the rectangular shape being parallel relative to a transverse axis extending perpendicularly relative to outboard plate (52) and inboard plate (56). Although tube (92) defines a rectangular configuration in the present example, it should be understood that in other examples, tube (92) may be square-shaped with the dimensions of tube (92) increased to permit tube (92) to extend from outboard plate (52) to inboard plate (56).

Figure 7:
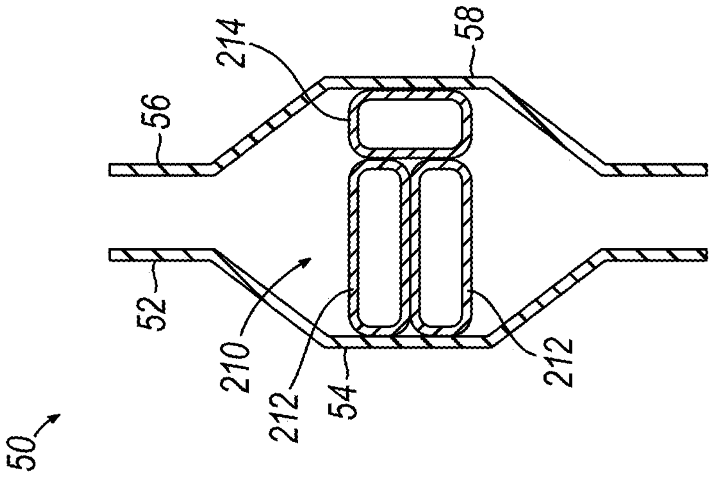
FIG. 7 depicts a front cross-sectional view of still another example of a reinforced rocker panel that may be readily incorporated into the vehicle of FIG. 1.

FIG. 7 shows still another alternative reinforcement structure (210) including three tubes (212, 214). Tubes (212, 214) of the present example include a pair of longitudinally oriented tubes (212) and a single transversely oriented tube (214) to form a generally asymmetrical configuration. Longitudinally oriented tubes (212) are positioned between plates (52, 56) to extend in a generally parallel or stacked configuration from one side of rocker panel (50) a greater distance than transversely oriented tube (214). In other words, longitudinally oriented tubes (212) are configured to occupy more width within rocker panel (50) relative to transversely oriented tube (214). In some examples, this configuration may be desirable to permit other structures of vehicle (10) to pass through tubes (212, 214) without adversely impacting performance. Additionally, this configuration may be desirable to provide control of performance characteristics depending on the side of rocker panel (50) (e.g., greater impact absorption on the outboard side versus the inboard side).

All tubes (212, 214) generally define a rectangular cross-sectional shape, although one or more of tubes (212, 214) may be of different shapes. Additionally, at least some dimensions of tubes (212, 214) may define a predetermined relationship with respect to other tubes (212, 214). For instance, the longitudinal dimension of transversely oriented tube (214) defines a length corresponding to the transverse dimension of both longitudinally oriented tubes (212) stacked together. Consequently, the combination of tubes (212, 214) defines a generally rectangular shape. Thus, the rectangular shape defined by tubes (212, 214) is oriented with the elongate portion of the rectangular shape being parallel relative to a transverse axis extending perpendicularly relative to outboard plate (52) and inboard plate (56). Although tubes (212, 214) together define a rectangular configuration in the present example, it should be understood that in other examples, tubes (212, 214) may form other suitable shapes, including both regular and irregular shapes.

Figure 8:
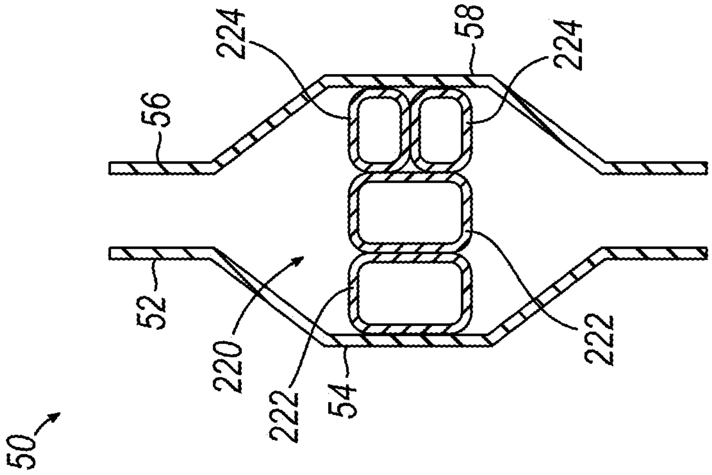
FIG. 8 depicts a front cross-sectional view of still another example of a reinforced rocker panel that may be readily incorporated into the vehicle of FIG. 1.

FIG. 8 shows still another alternative tube reinforcement structure (220) including four tubes (222, 224). Tubes (222, 224) of the present example include a pair of transversely oriented tubes (222) and a pair of longitudinally oriented tubes (224). Generally, transversely oriented tubes (222) span a greater width from plate (52) to plate (56) than longitudinally oriented tubes (224). Thus, tubes (222, 224) generally define a asymmetrical configuration across at least one dimension. As described above with respect to tubes (212, 214), such a configuration may be desirable to provide clearance for other structures of vehicle (10) and/or provide additional control of performance characteristics.

All tubes (222, 224) define a generally rectangular cross-sectional shape, although one or more of tubes (222, 224) may be of different shapes in other examples. Although all tubes (222, 224) define a generally rectangular shape, the size of one or more tubes (222, 224) may be different across one dimension. For instance, in the present example, the transverse dimension of one transversely oriented tube (222) is greater than the other transversely oriented tube (222), resulting in one transversely oriented tube (222) spanning a greater distance between plates (52, 56) than the other transversely oriented tube (222). Although transversely oriented tubes (222) in the present example define different dimensions relative to each other, it should be understood that in other examples, transversely oriented tubes (222) may be identical.

In the present example, tubes (222, 224) are arranged in a particular pattern. For instance, transversely oriented tubes (222) are stacked in a side-by-side configuration along an axis extending from plate (52) to plate (56). Meanwhile, longitudinally oriented tubes (224) are stacked in a height-wise configuration perpendicular to the arrangement of transversely oriented tubes (222). In this configuration, the combination of longitudinally oriented tubes (224) together define a height approximately equal to the longitudinal length of each transversely oriented tube (222) or less. Thus, the combine shape of all tubes (222, 224) is approximately rectangular.

Figure 9:
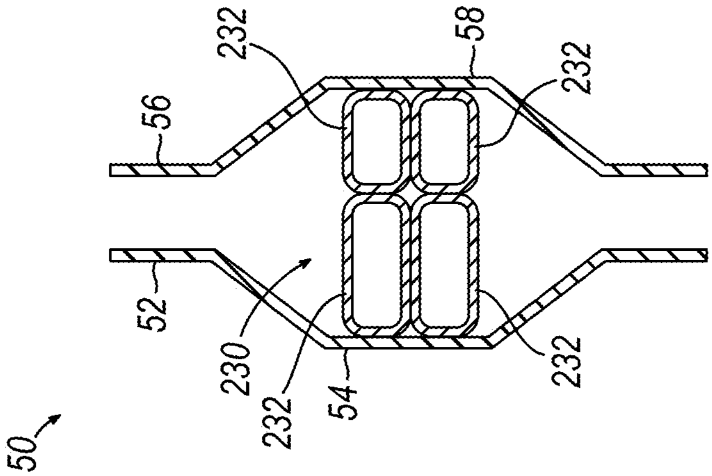
FIG. 9 depicts a front cross-sectional view of still another example of a reinforced rocker panel that may be readily incorporated into the vehicle of FIG. 1.

FIG. 9 shows still another alternative tube reinforcement structure (230) including four tubes (232). Tubes (232) in the present example are generally substantially similar and arranged in a grid or matrix-like array in a 2×2 pattern extending from one plate (52) to another plate (56). Each tube (232) generally defines a rectangular cross-sectional shape. The transverse dimension of each tube (232) is substantially similar for each tube.

In some examples, tubes (232) may define different lengths in the longitudinal dimension. For instance, in the present example, a pair of tubes (232) on one side of the array have a greater longitudinal length relative to tubes (232) on the opposite side of the array. Thus, in some examples, tubes (232) may be arranged in an asymmetrical configuration with the interface between tubes (232) being closer to one plate (52, 56) than another plate (52, 56). As similarly described above, such asymmetrical configurations may be desirable to provide clearance for other structures of vehicle (10) and/or provide additional control of performance characteristics.

Figure 10:
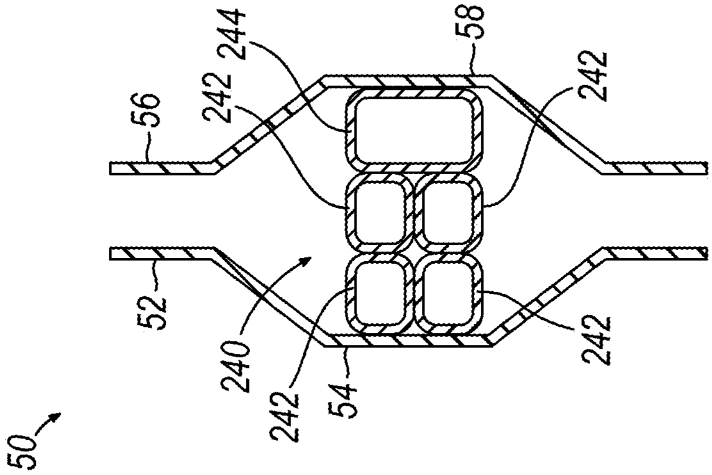
FIG. 10 depicts a front cross-sectional view of still another example of a reinforced rocker panel that may be readily incorporated into the vehicle of FIG. 1.

FIG. 10 shows still another alternative reinforcement structure (240) including tubes (242, 244) in a grid-like or matrix-like configuration. As can be seen, five tubes (242, 244) are included and arranged in a contiguous formation extending between outboard plate (52) and inboard plate (56). Specifically, in the present example, the formation of tubes (242, 244) includes four generally square tubes (242) in a 4×4 grid and a single rectangular tube (244) adjacent to the 4×4 grid of square tubes (242). All tubes (242, 244) are generally aligned symmetrically along a common transverse axis extending perpendicularly relative to outboard plate (52) and inboard plate (56).

Additionally, due to the combination of the 4×4 grid of square tubes (242) and single rectangular tube (244), the overall configuration of tubes (242, 244) is asymmetrical with more tubes being positioned on one side of rocker panel (50) (e.g., outboard plate (52) side) versus the other side of rocker panel (50). As similarly described above, this asymmetrical configuration may be desirable to permit clearance of other components associated with vehicle (10) and/or control the energy absorption or distortion characteristics of reinforcement structure (240). For instance, square tubes (242) configured as a 4×4 grid may be configured to absorb more energy relative to a single square tube (242). Thus, the 4×4 grid of tubes (242) may be positioned near an area of expected impact (e.g., outboard plate (52)).

Figure 11:
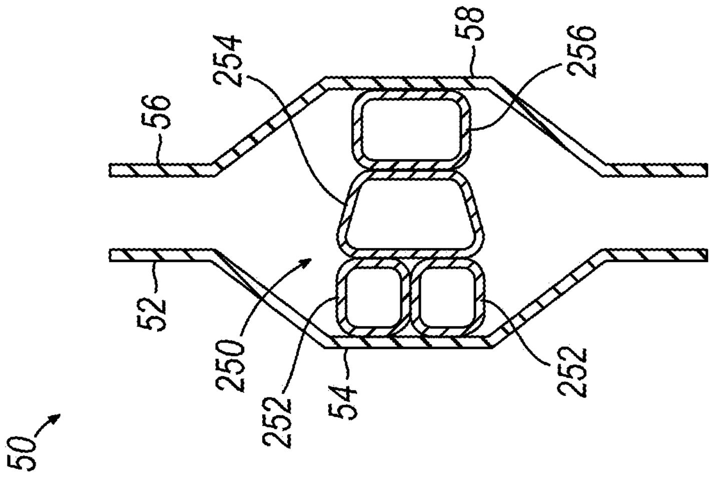
FIG. 11 depicts a front cross-sectional view of still another example of a reinforced rocker panel that may be readily incorporated into the vehicle of FIG. 1.

FIG. 11 shows still another alternative reinforcement structure (250) including tubes (252, 254, 256) arranged in a linear formation. As can be seen, four tubes (252, 254, 256) are included and arranged in a contiguous linear formation extending between outboard plate (52) and inboard plate (56). Specifically, in the present example, the formation of tubes (252, 254, 256) includes two generally square tubes (252) in a vertically stacked formation, one trapezoidal tube (254) adjacent to both square tubes (252) and a single rectangular tube (256) adjacent to on an opposite side of trapezoidal tube (254) relative to square tubes (252). All tubes (252, 254, 256) are generally aligned symmetrically along a common transverse axis extending perpendicularly relative to outboard plate (52) and inboard plate (56).

Additionally, due to the combination of square tubes (252), trapezoidal tube (254), and single rectangular tube (256), the overall configuration of tubes (252, 254, 256) is asymmetrical from one side of rocker panel (50) to the other. Specifically, the stacked arrangement of square tubes (252) places more structural material toward one side of rocker panel (50). As similarly described above, this asymmetrical configuration may be desirable to permit clearance of other components associated with vehicle (10) and/or control the energy absorption or distortion characteristics of reinforcement structure (250). For instance, square tubes (252) configured in a sacked configuration may be configured to absorb more energy relative to a single square tube (252). Thus, the stacked configuration of tubes (252) may be positioned near an area of expected impact (e.g., outboard plate (52)).

The combination of tubes (252, 254, 256) also defines an overall tapered shape from one side of plates (52, 56) to the other. In particular, the stacked configuration of square tubes (252) defines a relatively high height, while rectangular tube (256) defines a relatively low height. Meanwhile, trapezoidal tube (254) is disposed between square tubes (252) and rectangular tube (256) to provide a taper from the height of square tubes (252) to the height of rectangular tube (256). Thus, one side of trapezoidal tube (254) is about the same height as the combination of square tubes (252), while the opposite side of trapezoidal tube (254) is about the same height as rectangular tube (256). Such a configuration may be desirable in some examples to evenly distribute forces from square tubes (252) into rectangular tube (256).

Figure 12:
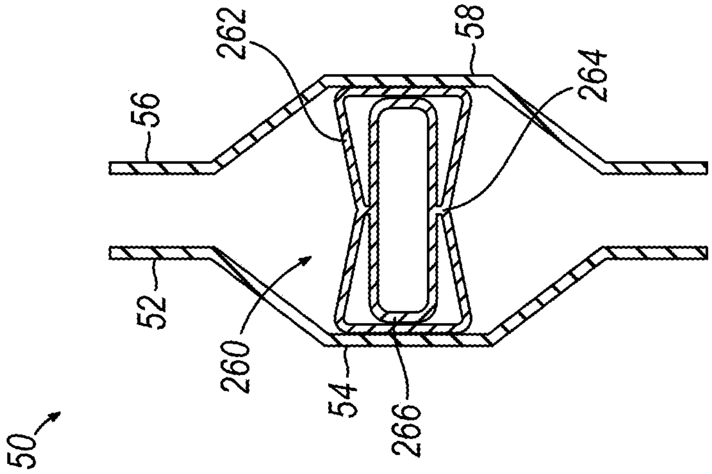
FIG. 12 depicts a front cross-sectional view of still another example of a reinforced rocker panel that may be readily incorporated into the vehicle of FIG. 1.

FIG. 12 shows still another alternative reinforcement structure (260) including tubes (262, 266) arranged in a tube-in-tube configuration. In particular, reinforcement structure (260) includes an outer tube (262), an inner tube (266), and one or more webs (266) connecting outer tube (262) to inner tube (266). Outer tube (262) defines a generally bow-tie shaped cross-section with a wider portion adjacent to each plate (52, 56) and a narrower portion disposed between plates (52, 56). Optionally, the narrower portion of outer tube (262) may be centered between plates (52, 56) in some examples. In other examples, the narrower portion may be offset or biased towards a particular plate (52, 56). Alternatively, in other examples, outer tube (262) may define different cross-sectional shapes, omitting narrower portion entirely. For instance, in some examples, outer tube (264) may define a generally rectangular cross-sectional shape or an irregular shape.

Inner tube (266) is disposed within outer tube (262) and extends longitudinally from one side of outer tube (262) to the other. Inner tube (266) defines a generally rectangular cross-sectional shape with a longitudinal dimension defined by the distance between each wider portion of outer tube (262) and a transverse dimension defined by the space defined by the narrower portion of outer tube (262). Although inner tube (266) of the present example is generally rectangular, different cross-sectional shapes may be used in other examples. Although the present example includes a single inner tube (266), it should be understood that in other examples, multiple inner tubes (266) may be used. In such examples, such multiple inner tubes (266) may be stacked horizontally or vertically. In addition, or in the alternative, in some examples additional tubes may be included within inner tube (266) to define a tube-in-tube-in tube configuration.

Optionally, reinforcement structure (260) includes a web (264) connecting outer tube (262) to inner tube (266). For instance, in the present example, web (264) extends inwardly from narrower portion of outer tube (262) connecting inner tube (266) to outer tube (262). Thus, outer tube (262) and inner tube (266) are generally integral with each other in the present example via web (264). In other examples, web (262) may be omitted. In such examples, narrower portion of outer tube (262) may instead intersect with inner tube (266) directly. Alternatively, in some examples, no structure may be present with respect to narrower portion of outer tube (262) connecting narrower portion of outer tube (262) to inner tube (266).

Example 1

Figure 13:
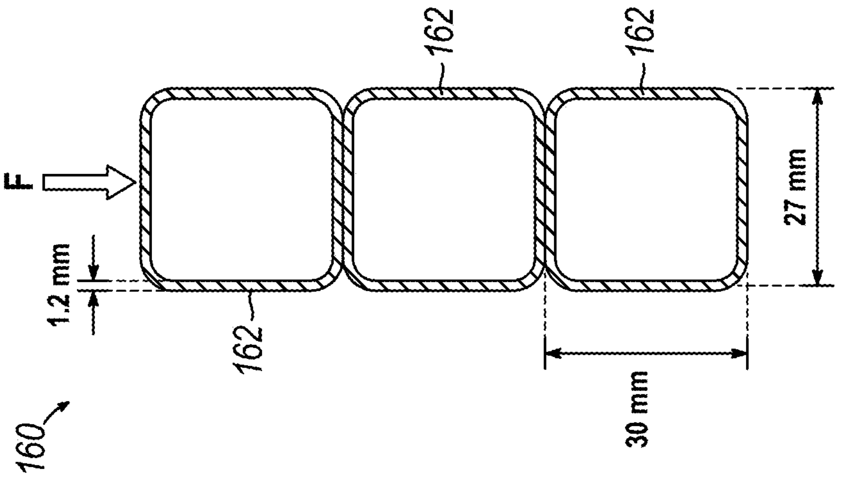
FIG. 13 depicts a front elevational view of a rocker reinforcement for the subject of mechanical testing.

A first test sample (160) was prepared in accordance with the description of reinforcement structure (60) described above. Specifically, FIG. 13 shows first test sample (160) as including three tubes (162) joined together to form a row of tubes (162) with each tube (162) being aligned along a common axis. Each tube (162) was prepared with a generally square-shaped cross-section with one side measuring 27 mm and another side measuring 30 mm. All tubes (162) were formed of a steel material of DP780 grade. The gauge or wall thickness of each tube (162) was 1.2 mm. Tubes were joined to each other by laser welding.

First test sample (160) was subjected to a 3-point bending test with a force (F) applied to first test sample (160) as shown in FIG. 13. The 3-point bend test used an anvil diameter of 100 mm, a punch travel of 100 mm, and a support span of 400 mm.

Figure 15:
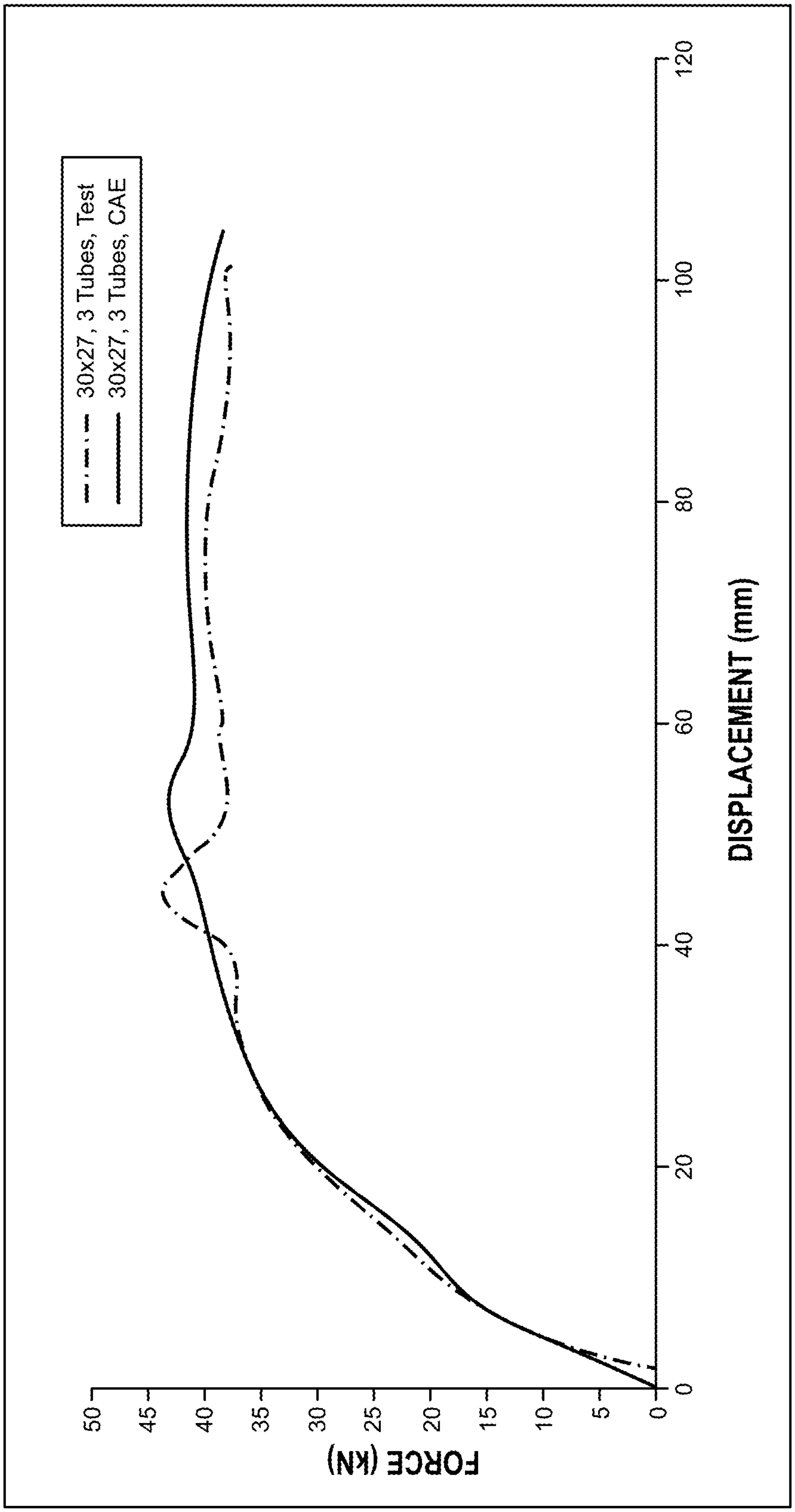
FIG. 15 depicts a plot comparing experimentally derived versus finite element analysis (FEA) derived force-displacement data from a 3-point bending test for a rocker reinforcement of the configuration of the rocker reinforcement of FIG. 13.

A finite element analysis (FEA) model of first test sample (160) was also prepared and the same 3-point bend test was simulated digitally. The results of the experimental 3-point bend test versus the FEA digital simulation were compared as shown in FIG. 15. A good correlation between the experimental 3-point bend test and the digital simulation was observed.

Example 2

Figure 14:
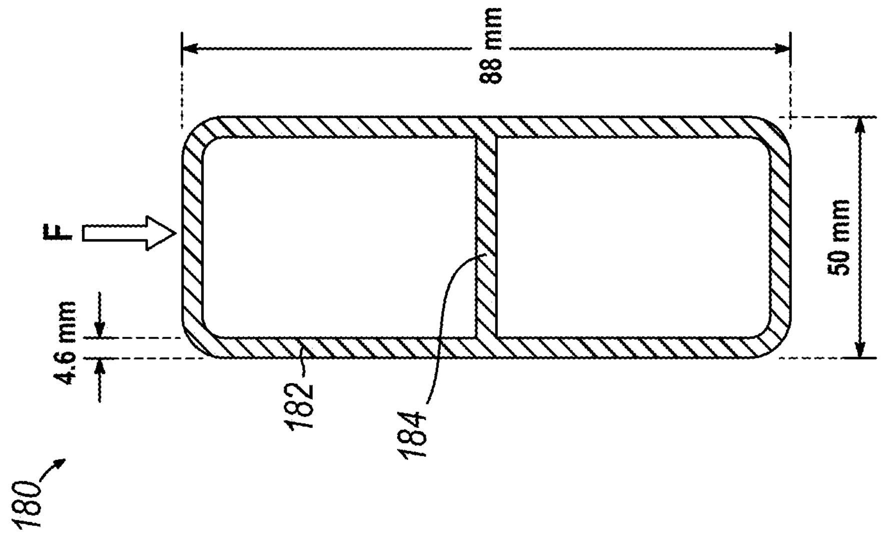
FIG. 14 depicts a front elevational view of a comparative rocker reinforcement for the subject of mechanical testing.

A second test sample (180) was prepared as a comparative example. Specifically, FIG. 14 shows the second test sample (180) as including a single unitary part defining a body (182) with a web (184) extending from opposite sides of the body (182). The web (184) was centered at each side. Body (182) defined a rectangular cross-section with the long side defining a length of 88 mm and the short side defining a length of 50 mm. The web (184) defined a length of 40.8 mm (the length of the short side minus the wall thickness). Both body (182) and web (184) defined a wall thickness of 4.6 mm. Second test sample (180) was configured to be substantially the same weight as first test sample (160). Specifically, first test sample (160) included less material but at a higher density (e.g., steel), while second test sample (180) included more material but at a lower density (e.g., aluminum).

As described above, second test sample (180) was formed of a single part. To form second test sample (180) as a single part, second test sample (180) was formed by an extrusion process using an aluminum material. The particular aluminum material used was 6000 series aluminum.

Second test sample (180) was subjected to a 3-point bending test with a force (F) applied to second test sample (180) as shown in FIG. 14. The 3-point bend test used an anvil diameter of 100 mm, a punch travel of 100 mm, and a support span of 400 mm.

Figure 16:
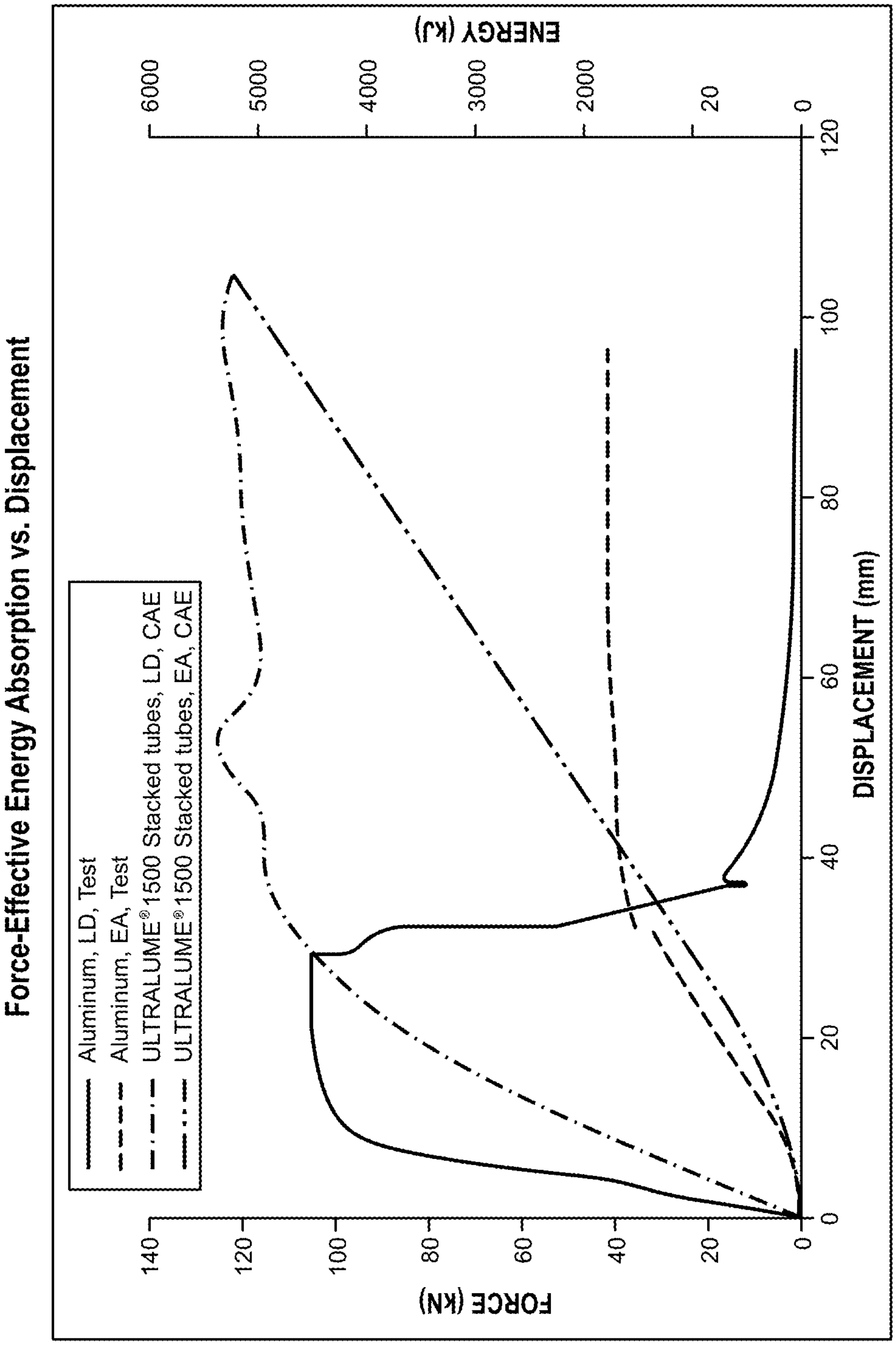
FIG. 16 depicts a plot of FEA derived force-effective energy absorption versus displacement data for a rocker reinforcement of the configuration of the rocker reinforcement of FIG. 13 scaled for 1500 grade steel versus experimentally derived data for an aluminum rocker reinforcement of the configuration of the comparative rocker panel of FIG. 14.

The FEA model validated in the testing of Example 1 was scaled to a steel material of 1500 MPa grade (specifically ULTRALUME® 1500 manufactured by Cleveland-Cliffs, Inc.) with a gauge or wall thickness of 1.7 mm. The same 3-point bend test was again digitally simulated with the scaled FEA model. The results of the experimental 3-point bend test for second test sample (180) versus the FEA digital simulation of the scaled FEA model were compared as shown in FIG. 16. Outperformance of the scaled FEA model over second test sample (180) was observed both in terms of peak force and energy absorption. Thus, a rocker panel with a reinforcement structure of the configuration of first test sample (160) made of 1500 MPa grade steel will outperform the second test sample (180) made of aluminum despite both configurations being substantially the same weight.

Example 3

Further digital simulations were performed to test the relationship between tube thickness and performance for the configuration of the first test sample (160). As with Example 2 described above, the testing of Example 1 was scaled to a steel material of 1500 MPa grade (specifically ULTRALUME® 1500 manufactured by Cleveland-Cliffs, Inc.). The same 3-point bend test was again digitally simulated with the scaled FEA model. However, unlike the simulation described above with respect to Example 2, the simulation was performed for a variety of thicknesses for tubes (162). Specifically, thicknesses of 1.4 mm, 1.7 mm, and 1.9 mm were simulated. The 1.4 mm thickness corresponded to a steel configuration having 15% less mass in comparison to the mass of the aluminum configuration of the second test sample (180). The 1.7 mm thickness corresponded to a steel configuration having about the same mass in comparison to the mass of the aluminum configuration of the second test sample (180). The 1.9 mm thickness corresponded to a steel configuration having 15% more mass in comparison to the mass of the aluminum configuration of the second test sample (180).

Figure 17:
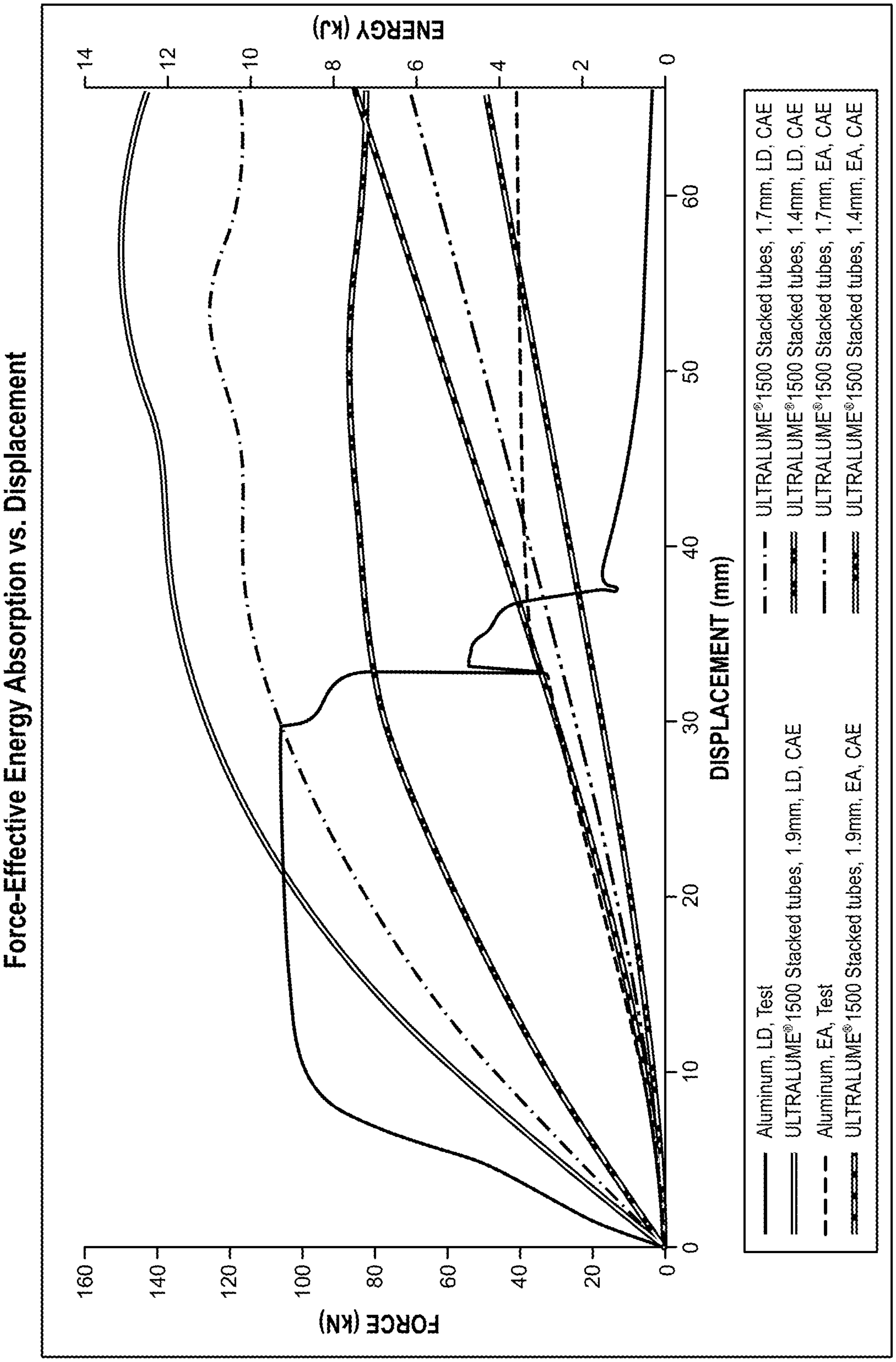
FIG. 17 depicts a plot of FEA derived force-effective energy absorption versus displacement data for a rocker reinforcement of the rocker reinforcement of FIG. 13 scaled for 1500 grade steel at three thicknesses versus experimentally derived data for an aluminum rocker reinforcement of the configuration of the comparative rocker panel of FIG. 14.

The results of the experimental 3-point bend test for second test sample (180) versus the FEA digital simulation for 1.4, 1.7, and 1.9 mm thicknesses of the scaled FEA model were compared as shown in FIG. 17. Outperformance of the scaled FEA model at different thicknesses over second test sample (180) was generally observed both in terms of peak force and energy absorption. Although outperformance of the 1.4 mm thickness was not observed with respect to peak force, outperformance relative to the aluminum configuration of second test sample (180) was still observed with respect to energy absorption after about 55 mm of displacement. Thus, a rocker panel with a reinforcement structure of the configuration of first test sample (160) made of 1500 MPa grade steel will outperform the second test sample (180) made of aluminum despite both configurations being substantially the same weight. Additionally, a rocker panel with a reinforcement structure of the configuration of the first test sample (160) made of 1500 MPa grade steel will outperform the second test sample (180) made of aluminum in at least some capacity with less weight in the configuration of the first test sample (160).

Example 4

Figure 18:
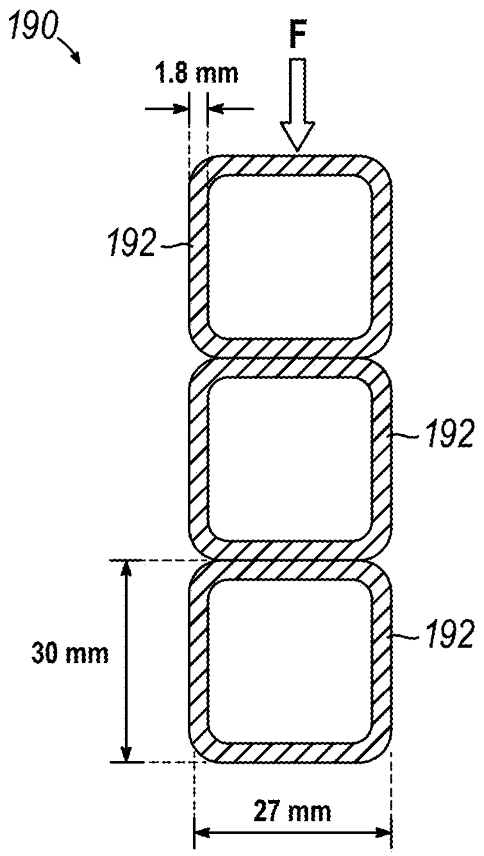
FIG. 18 depicts a front elevational view of another rocker reinforcement for the subject of mechanical testing.

A third test sample (190) was prepared in accordance with the description of reinforcement structure (60) described above. Specifically, FIG. 18 shows third test sample (190) as including three tubes (192) joined together to form a row (or column depending on orientation) of tubes (192) with each tube (192) being aligned along a common axis. Each tube (192) was prepared with a generally square-shaped cross-section with one side measuring 27 mm and another side measuring 30 mm. All tubes (192) were formed of a steel material of 1500 MPa grade (specifically FORMTUBE® QHS 1500 manufactured by Cleveland-Cliffs, Inc.). The gauge or wall thickness of each tube (192) was 1.8 mm. Tubes were joined to each other by laser welding.

Third test sample (190) was subjected to a 3-point bending test with a force (F) applied to first test sample (190) as shown in FIG. 18. The 3-point bend test used an anvil diameter of 100 mm, a punch travel of 100 mm, and a support span of 400 mm.

Figure 19:
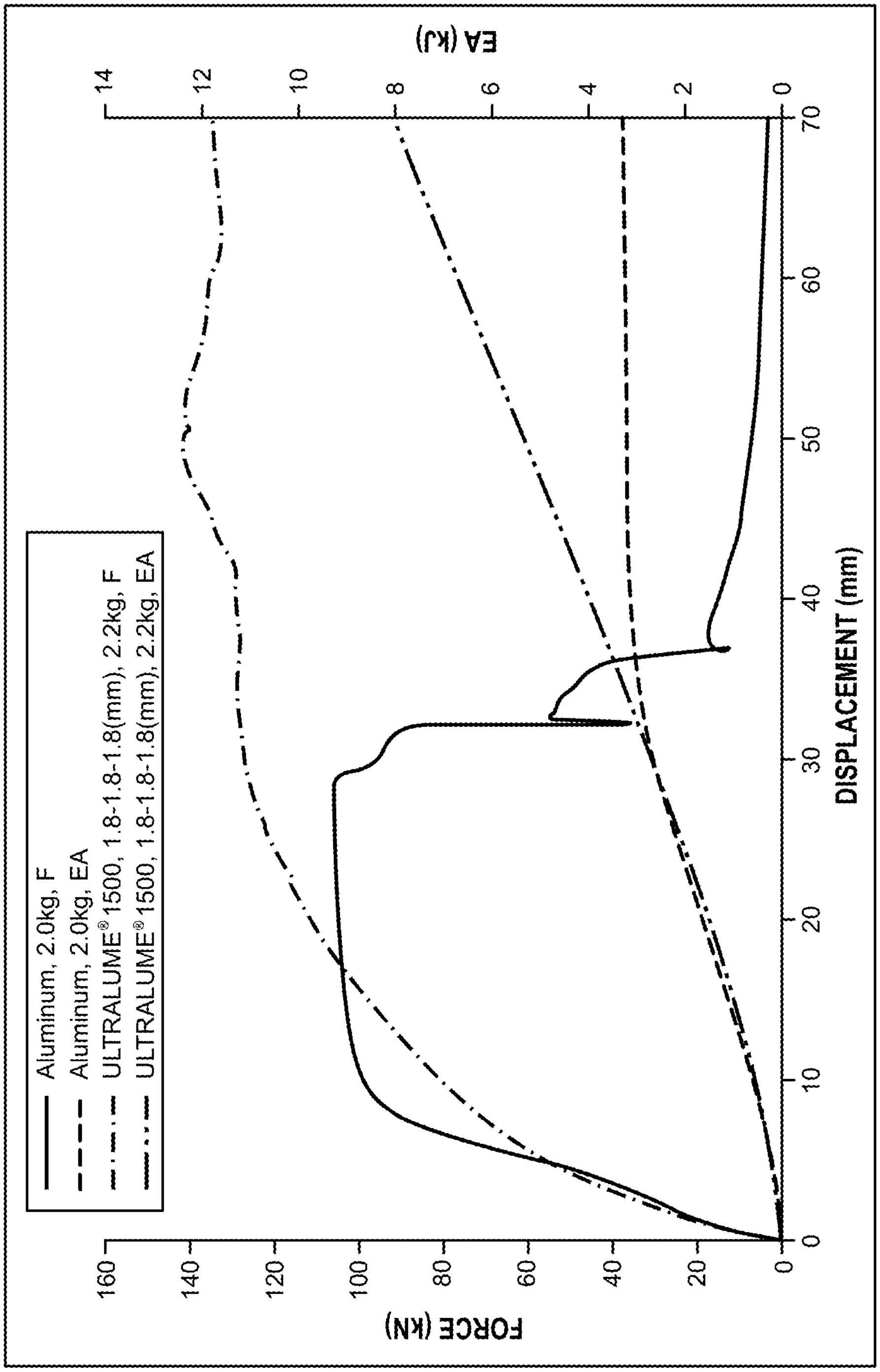
FIG. 19 depicts a plot of experimentally derived force-effective energy absorption versus displacement data for a rocker reinforcement of the rocker reinforcement of FIG. 18 versus experimentally derived data for an aluminum rocker reinforcement of the configuration of the comparative rocker panel of FIG. 14.

The results of the experimental 3-point bend test for third test sample (190) are shown in FIG. 19. For comparison purposes, the results of the experimental 3-point bend test for the second test sample (180) described above with respect to Example 2 are also shown in FIG. 19. Outperformance of the third test sample (190) over second test sample (180) was observed both in terms of peak force and energy absorption. Thus, a rocker panel with a reinforcement structure of the configuration of third test sample (190) made of 1500 MPa grade steel will outperform the second test sample (180) made of aluminum despite both configurations being of similar same weights. More specifically, the third test sample (190) had a 10% greater weight to the second test sample (180), yet had substantially superior performance in terms of peak force (33% outperformance) and energy absorption (>50% outperformance).

Example 5

A rocker panel for use in a vehicle, the rocker panel comprising: an outboard plate; an inboard plate; a reinforcement structure disposed between the inboard plate and the outboard plate, the reinforcement structure including one or more discrete steel tubes extending longitudinally between the outboard plate and the inboard plate.

Example 6

The rocker panel of Example 5, wherein the reinforcement structure includes three tubes arranged along an axis extending from the outboard plate to the inboard plate.

Example 7

The rocker panel of Example 6, wherein the tubes are arranged in a row.

Example 8

The rocker panel of Example 5, wherein the reinforcement structure includes five tubes, wherein one or more of the tubes are arranged in a contiguous formation extending from the outboard plate to the inboard plate.

Example 9

The rocker panel of Example 8, wherein four of the five tubes are arranged in a 4×4 grid pattern, wherein a single tube of the five tubes is arranged adjacent to the 4×4 grid pattern.

Example 10

The rocker panel of Examples 8 or 9, wherein the tubes are arranged in a symmetrical configuration along a common axis extending from the outboard plate to the inboard plate.

Example 11

The rocker panel of Example 10, wherein the common axis is oriented perpendicularly relative to a portion of the outboard plate and a portion of the inboard plate.

Example 12

The rocker panel of Example 5, wherein the reinforcement structure includes two tubes, wherein the two tubes are arranged in a contiguous formation extending from the outboard plate to the inboard plate.

Example 13

The rocker panel of Example 12, wherein the two tubes form a row extending from the outboard plate to the inboard plate.

Example 14

The rocker panel of Example 6, wherein the reinforcement structure includes a single tube extending from a surface of the outboard plate to a surface of the inboard plate.

Example 15

The rocker panel of any of Examples 5 through 14, wherein the one or more tubes each define a square-shaped cross-section.

Example 16

The rocker panel of any of Examples 5 through 14, wherein the one or more tubes each define a circular-shaped cross-section.

Example 17

The rocker panel of any of Examples 5 through 16, wherein the one or more tubes each define a wall thickness, wherein the wall thickness is between 1 and 2 mm.

Example 18

The rocker panel of Example 17, wherein the wall thickness is 1.2 mm or 1.8 mm.

Example 19

The rocker panel of any of Example 5 through 18, wherein the one or more tubes each are formed of a single grade of steel, wherein the single grade of steel includes dual phase 780 grade steel.

Example 20

The rocker panel of any of Examples 5 through 18, wherein the one or more tubes each are formed of a single grade of steel, wherein the single grade of steel includes 1500 grade steel.

Example 21

The rocker panel of any of Examples 5 through 18, wherein the one or more tubes each are formed of multiple grades of steel.

Example 22

The rocker panel of Example 21, wherein at least one of the multiple grades of steel includes dual phase 780 grade steel or 1500 grade steel.

Example 23

The rocker panel of any of Examples 5 through 22, wherein the one or more tubes includes a plurality of tubes, wherein each tube of the plurality of tubes is joined to another adjacent tube by a joining method.

Example 24

The rocker panel of Example 23, wherein the joining method includes welding.

Example 25

The rocker panel of Example 24, wherein the welding includes laser welding.

Example 26

The rocker panel of Example 25, wherein the joining method includes mechanical fastening.

Example 27

The rocker panel of Example 23, wherein the joining method includes chemical fastening.

Example 28

The rocker panel of Example 23, wherein the joining method includes a combination of joining methods selected, the combination of joining methods including one or more of welding, mechanical fastening, and chemical fastening.

Example 29

A rocker panel for use in a vehicle, the rocker panel comprising: an outboard plate; an inboard plate; a reinforcement structure disposed between the inboard plate and the outboard plate, the reinforcement structure including a plurality of discrete steel tubes disposed between the inboard plate and the outboard plate in a predetermined arrangement, the predetermined arrangement extending longitudinally between the outboard plate and the inboard plate.

Example 30

The rocker panel of Example 29, wherein the plurality of discrete tubes includes a pair of longitudinally oriented tubes stacked on top of each other and a single transversely oriented tube positioned adjacent to the longitudinally oriented tubes.

Example 31

The rocker panel of Example 29, wherein the plurality of discrete tubes includes a pair of transversely oriented tubes positioned in a side-by-side arrangement and a pair of longitudinally oriented tubes positioned adjacent to at least one transversely oriented tube of the pair of transversely oriented tubes/

Example 32

The rocker panel of Example 31, wherein the pair of longitudinally oriented tubes are further positioned a stacked arrangement with one longitudinally oriented tube being positioned on top of the other longitudinally oriented tube.

Example 33

The rocker panel of Example 29, wherein the plurality of discrete tubes includes four longitudinally oriented tubes arranged in a 4×4 grid.

Example 34

The rocker panel of Example 33, wherein the 4×4 grid of the four longitudinally oriented tubes includes one column of longitudinally oriented tubes of a longer longitudinal dimension relative to the other column of longitudinally oriented tubes.

Example 35

The rocker panel of Example 29, wherein the plurality of discrete tubes includes a plurality of square tubes and a single rectangular tube disposed adjacent to the plurality of square tubes.

Example 36

The rocker panel of Example 35, the plurality of square tubes including four square tubes, the four square tubes being oriented in a 4×4 grid.

Example 37

The rocker panel of Example 36, wherein the longitudinal dimension of the single rectangular tube is approximately equal to a dimension of one column of the 4×4 grid of the four square tubes.

Example 38

The rocker panel of Example 29, wherein the plurality of discrete tubes includes a trapezoidal tube positioned between two rectangular or square tubes.

Example 39

The rocker panel of Example 29, wherein the plurality of discrete tubes includes a pair of square tubes, a trapezoidal tube, and a rectangular tube, the trapezoidal tube being positioned between the pair of square tubes and the rectangular tube.

Example 40

The rocker panel of Example 39, wherein the trapezoidal tube defines a first dimension and a second dimension, the first dimension being larger than the second dimension, the pair of square tubes being adjacent to a surface of the trapezoidal tube defining the first dimension, the rectangular tube being adjacent to a surface of the trapezoidal tube defining the second dimension.

Example 41

The rocker panel of Example 29, wherein the plurality of discrete tubes includes an outer tube and an inner tube, the inner tube being disposed within at least a portion of the outer tube.

Example 42

The rocker panel of Example 41, the inner tube being entirely surrounded by the outer tube.

Example 43

The rocker panel of Examples 41 or 42, the reinforcement structure further including at least one web, the at least one web extending from the inner tube to the outer tube to form a single integral structure.

Example 44

The rocker panel of any of Examples 41 through 43, the outer tube defining a bow-tie-shaped cross-section, the inner tube defining a rectangular-shaped cross-section.

We claim:

1. A rocker panel for use in a vehicle, the rocker panel comprising:

(a) an outboard plate;

(b) an inboard plate;

(c) a reinforcement structure disposed between the inboard plate and the outboard plate, the reinforcement structure including:

i. an outer tube extending longitudinally between the outboard plate and the inboard plate, the outer tube defining at least a portion of an outer perimeter of the reinforcement structure, the outer perimeter including an indented portion disposed between the outboard plate and the inboard plate; and ii. an inner tube disposed within at least a portion of the outer tube, the inner tube defining a rectangular cross-section.

2. The rocker panel of claim 1, wherein the two tubes are arranged in a contiguous formation extending from the outboard plate to the inboard plate.

3. The rocker panel of claim 1, wherein the tubes each define a wall thickness, wherein the wall thickness is between 1 and 2 mm.

4. The rocker panel of claim 3, wherein the wall thickness is 1.2 mm or 1.8 mm.

5. The rocker panel of claim 1, wherein the tubes each are formed of a single grade of steel, wherein the single grade of steel includes dual phase 780 grade steel or 1500 grade steel.

6. The rocker panel of claim 1, wherein the tubes are formed of different grades of steel.

7. The rocker panel of claim 1, wherein the tubes each are formed of a single grade of steel, wherein the single grade of steel includes dual phase 780 grade steel, 1500 MPa grade steel, a mild steel grade, a high-strength steel grade, an advanced high-strength steel grade, or an ultra-high strength steel grade having a strength of at least 1650 MPa.

8. The rocker panel of claim 1, wherein the tubes each define a wall thickness, wherein the wall thickness is between 1 and 3.6 mm.

9. A rocker panel for use in a vehicle, the rocker panel comprising:

(a) an outboard plate;

(b) an inboard plate;

(c) a reinforcement structure disposed between the inboard plate and the outboard plate, the reinforcement structure including a plurality of discrete steel tubes disposed between the inboard plate and the outboard plate in a predetermined arrangement, the predetermined arrangement extending longitudinally between the outboard plate and the inboard plate, wherein the plurality of discrete tubes includes an outer tube and an inner tube, the inner tube being disposed within at least a portion of the outer tube, the outer tube defining at least a portion of an outer perimeter of the reinforcement structure, the outer perimeter including an indented portion disposed between the outboard plate and the inboard plate, the inner tube defining a rectangular-shaped cross-section.

10. The rocker panel of claim 9, the inner tube being entirely surrounded by the outer tube.

11. The rocker panel of claim 9, the reinforcement structure further including at least one web, the at least one web extending from the inner tube to the outer tube to form a single integral structure.

12. The rocker panel of claim 9, the outer tube defining a bow-tie-shaped cross-section.

* * * * *